United States Patent
Plante et al.

(10) Patent No.: US 11,629,665 B2
(45) Date of Patent: Apr. 18, 2023

(54) GAS TURBINE ENGINE AND METHOD OF CREATING CLASSES OF SAME

(71) Applicant: PRATT & WHITNEY CANADA CORP., Longueuil (CA)

(72) Inventors: Ghislain Plante, Verdun (CA); Keith Morgan, Westmount (CA); Stephen Mah, Brossard (CA); Patrick Valois, Longueuil (CA); Robert Peluso, St-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 574 days.

(21) Appl. No.: 16/565,722

(22) Filed: Sep. 10, 2019

(65) Prior Publication Data

US 2020/0080516 A1 Mar. 12, 2020

Related U.S. Application Data

(60) Provisional application No. 62/729,624, filed on Sep. 11, 2018.

(51) Int. Cl.
*F02K 3/02* (2006.01)
*F02C 3/107* (2006.01)
*F02K 3/06* (2006.01)

(52) U.S. Cl.
CPC ............. *F02K 3/025* (2013.01); *F02C 3/107* (2013.01); *F02K 3/06* (2013.01)

(58) Field of Classification Search
CPC .... F02K 3/025; F02K 3/06; F02C 3/04; F02C 3/10; F02C 3/107; F02C 6/206; F02C 3/113; F02C 7/36; F02C 9/56; F01D 15/12; F05D 2260/40; F05D 2260/403–40311; F05D 2230/80; F05D 2230/61

See application file for complete search history.

(56) References Cited

U.S. PATENT DOCUMENTS 8,337,149 B1 12/2012 Hasel et al.
2015/0300250 A1* 10/2015 Suciu .................. F02K 3/06
60/39.12

(Continued)

FOREIGN PATENT DOCUMENTS

WO WO2014/204526 A2 12/2014

OTHER PUBLICATIONS

European Aviation Safety Agency, Type-certificate Data Sheet for Engine PW100 series engines (Mar. 2018), European Aviation Safety Agency, TCDS No. IM.E.041 Issue: 04, ALL (Year: 2018).*

(Continued)

*Primary Examiner* — Jason H Duger
(74) *Attorney, Agent, or Firm* — Norton Rose Fulbright Canada LLP

(57) ABSTRACT

An aircraft engine has a high pressure spool including a high pressure turbine drivingly connected to a high pressure compressor. A low pressure spool including a low pressure compressor is fluidly connected to the high pressure compressor. A low pressure turbine is drivingly connected to the low pressure compressor to drive the low pressure compressor. A load is drivingly connected to the low pressure turbine, the load consisting of one of a propeller and a helicopter rotor. A method of creating classes of an aircraft engine from an engine platform is disclosed.

32 Claims, 7 Drawing Sheets

(56) References Cited

U.S. PATENT DOCUMENTS

2018/0023482 A1* 1/2018 Lefebvre .................. F02C 3/10
 415/68
2018/0073438 A1 3/2018 Durocher et al.

OTHER PUBLICATIONS

Pratt & Whitney Canada, PW 100/150 (Oct. 2016), https://web.archive.org/web/20161013185929/http://www.pwc.ca/en/engines/pw100-pw150, public webpage archived Oct. 13, 2016 by the Internet Archive Wayback Machine, copy retrieved Apr. 1, 2022. (Year: 2016).*
United Turbine Corp.: "PT6 descriptive course and guide to troubleshooting", Jun. 20, 2016 (Jun. 20, 2016), pp. 1-69, XP055662516, Retrieved from the Internet: URL:https://web.archive.org/web/20160620200612if_/http://mautone.eng.br/apostilas/propulsao1/PT6%20Training%20Manual.pdf [retrieved on Jan. 28, 2020].
European Search Report received in counterpart application No. 19196822.1 dated Feb. 12, 2020.
Honeywell: "Type Certificate Data Sheet No. E6NE Revision 15", Jan. 1, 2002 (Jan. 1, 2002), pp. 1-10, XP055894919, Retrieved from the Internet: URL:https://rgl.faa.gov/Regulatory and Guidance Library/rg Make Model. nsf/0/3f30606514a3b28086256bea006c249c/$FILE/e6ne.pdf [retrieved on Feb. 3, 2022].

* cited by examiner

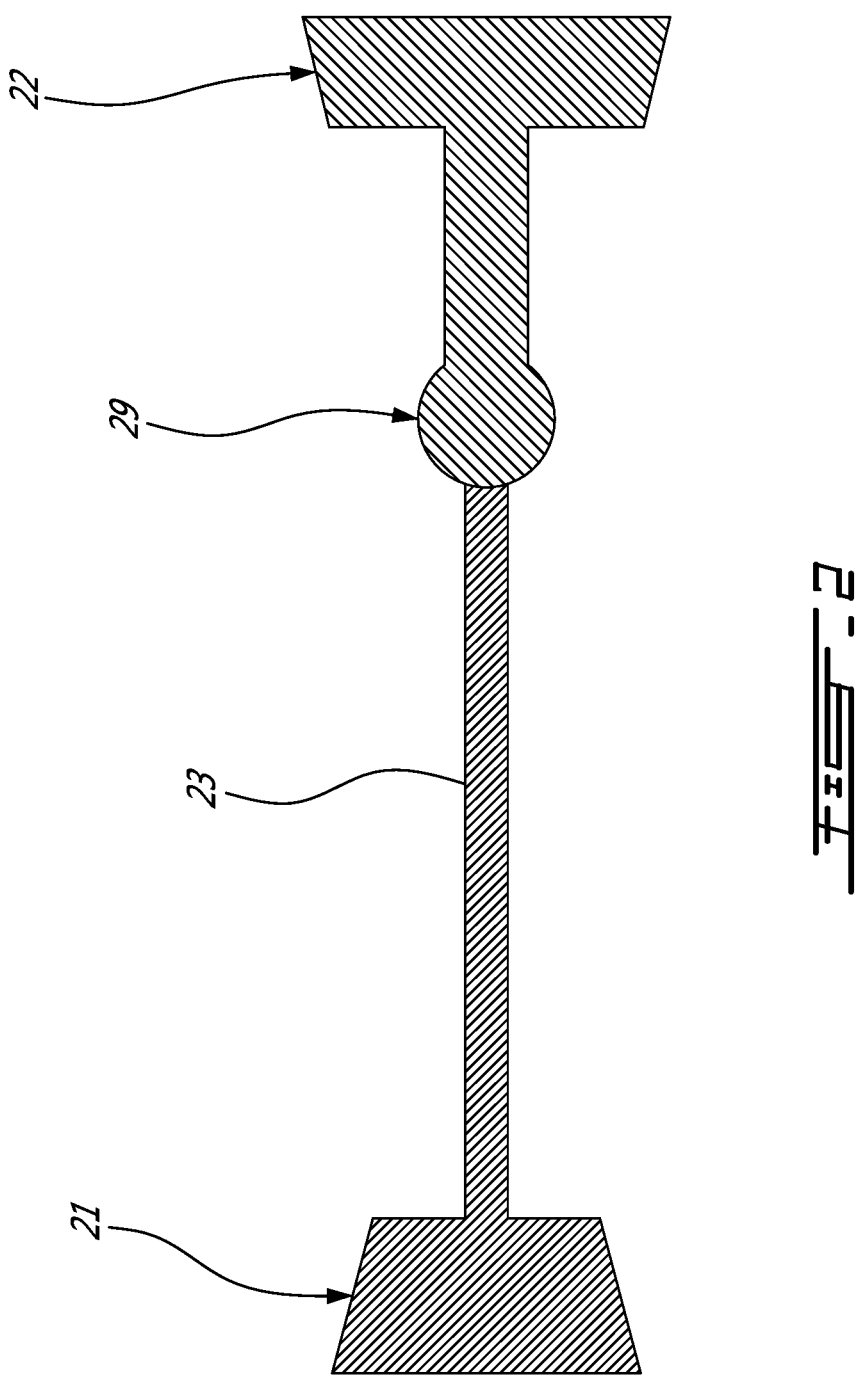

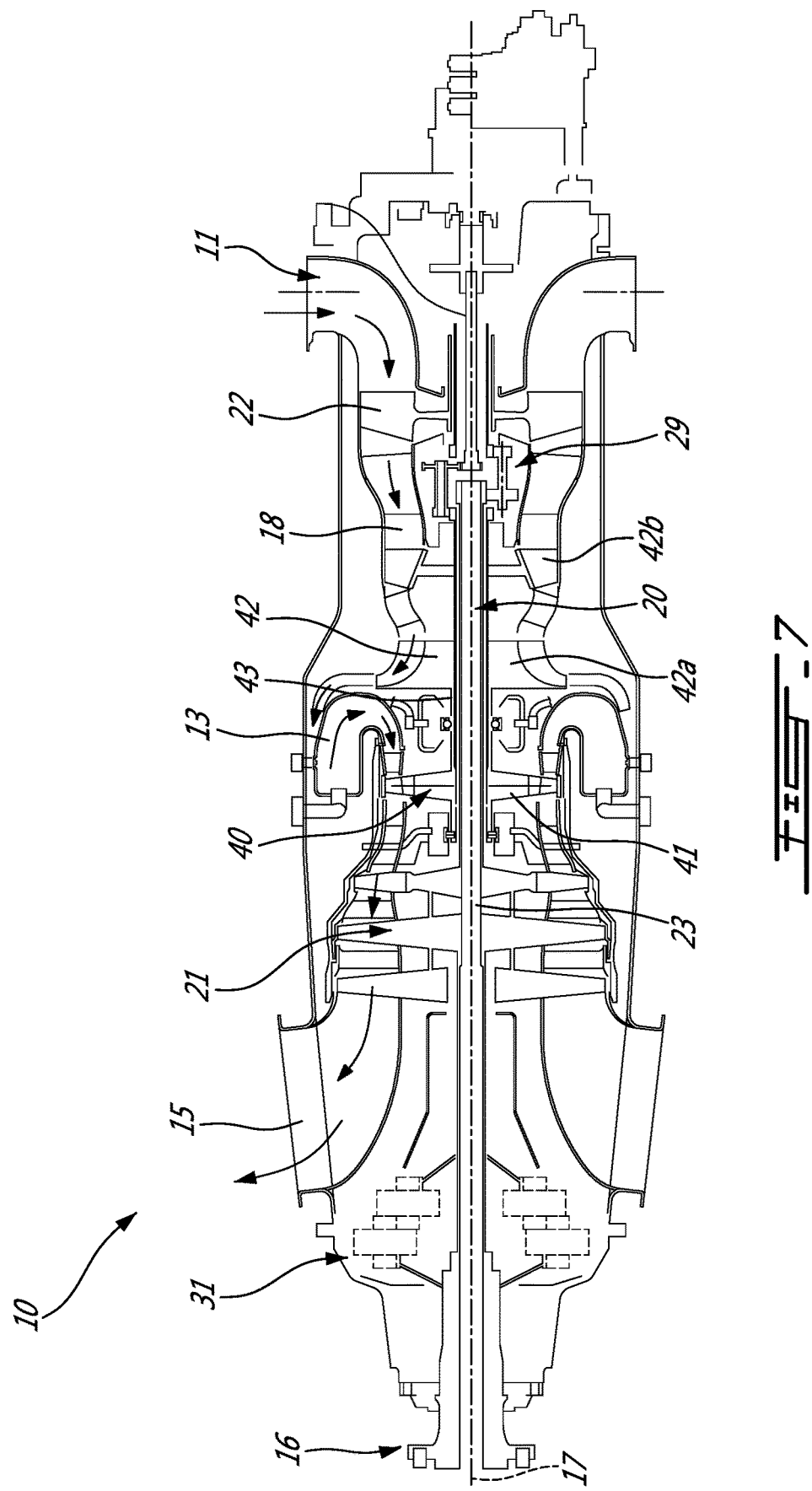

GAS TURBINE ENGINE AND METHOD OF CREATING CLASSES OF SAME

CROSS-REFERENCE TO RELATED APPLICATIONS

This application claims priority to U.S. provisional patent application No. 62/729,624 filed Sep. 11, 2018, the entire contents of which are incorporated by reference herein.

TECHNICAL FIELD

The application relates generally to gas turbine engines and, more particularly, to the design thereof.

BACKGROUND

Gas turbine engines may be designed using the "point" or "platform" design methodologies. In point design, the gas turbine engine is designed to meet specific requirements such as fuel consumption and output power for a single application. While point design gas turbine engines operate at high efficiency at their design conditions, operating a point design gas turbine engine at non-optimized conditions may result in inefficiencies. The platform design approach involves using a standard core for the gas turbine engine, and adding specific components to the core to meet the performance requirements. This scaling approach reduces the cost of technology development but may result in engine performance that is less optimal than that achieved using the point design methodology.

SUMMARY

There is disclosed a method of creating classes of gas engines from a common engine platform, the common engine platform having a longitudinal center axis, a core having a high pressure turbine drivingly connected to a high pressure compressor, a low pressure turbine drivingly connected to a low pressure compressor and to a rotatable load, and an annular gas path extending radially between a radially-inner flow boundary surface and a radially-outer flow boundary surface and extending axially through the low pressure compressor, the high pressure compressor, the high pressure turbine, and the low pressure turbine, the method comprising: creating a first class of the engine by configuring the low pressure compressor to run at a first speed to produce a first power output; and creating a second class of the engine by using the low pressure compressor to run at a second speed to produce a second power output, the second speed being different from the first speed and the second power output being different than the first power output, the annular gas path of the first and second classes of the turboshaft or turboprop engine having a same gas path profile around the core.

There is disclosed classes of a gas turbine engine, comprising: a first class of the gas turbine engine having a longitudinal center axis, a core having a high pressure turbine drivingly connected to a high pressure compressor, a low pressure turbine drivingly connected to a low pressure compressor and to a rotatable load, and an annular gas path extending radially between a radially-inner flow boundary surface and a radially-outer flow boundary surface and extending axially through the low pressure compressor, the high pressure compressor, the high pressure turbine, and the low pressure turbine, a gas path profile of the annular gas path defined around the core, the low pressure compressor configured to run at a first speed to produce a first power output; and a second class of the gas turbine engine comprising the same gas path profile around the core as the first class of the gas turbine engine, and the low pressure compressor of the first class of the gas turbine engine, the low pressure compressor in the second class of the gas turbine engine configured to run at a second speed to produce a second power output, the second speed being different from the first speed and the second power output being different than the first power output.

There is disclosed herein is a method of providing at least two classes of an aircraft gas turbine engine, the method comprising: providing a first class of the engine having a first high pressure turbine driving a first high pressure compressor, and a first low pressure turbine driving a first low pressure compressor and an output configured to drive a rotating aircraft propulsion load, the first low pressure compressor and the first high pressure compressor having respective first gas path profiles extending from respective inlets to respective outlets of the first high and low pressure compressors, said first gas path profiles respectively defined between a radially-inner flow boundary surface and a radially-outer flow boundary surface of the respective compressor; configuring the first class of the engine so that the first low pressure compressor in use runs at a first speed to produce a first power output at a first engine selected design point; providing a second class of the engine having a second high pressure turbine driving a second high pressure compressor, a second low pressure turbine driving a second low pressure compressor and an output configured to drive a rotating aircraft propulsion load, the second low pressure compressor and the second high pressure compressor having respective second gas path profiles extending from respective inlets to respective outlets of the second high and low pressure compressors, said second gas path profiles respectively defined between a radially-inner flow boundary surface and a radially-outer flow boundary surface of the respective compressor, the second gas path profile of the second low pressure compressor is the same as the first gas path profile of the first low pressure compressor, and the second gas path profile of the second high pressure compressor is the same as the first gas path profile of the first high pressure compressor; and configuring the second class of the engine so that the second low pressure compressor in use runs at a second speed to produce a second power output at a second engine selected design point, the second speed different from the first speed and the second power output different from the first power output.

DESCRIPTION OF THE DRAWINGS

Reference is now made to the accompanying figures in which:

FIG. 2 is a schematic cross-sectional partial view of the main low spool components of a gas turbine engine according to another embodiment of the present disclosure;

FIGS. 7 and 7B show cross-sectional views of an embodiment of an engine according to the present disclosure.

DETAILED DESCRIPTION

Figure 1:
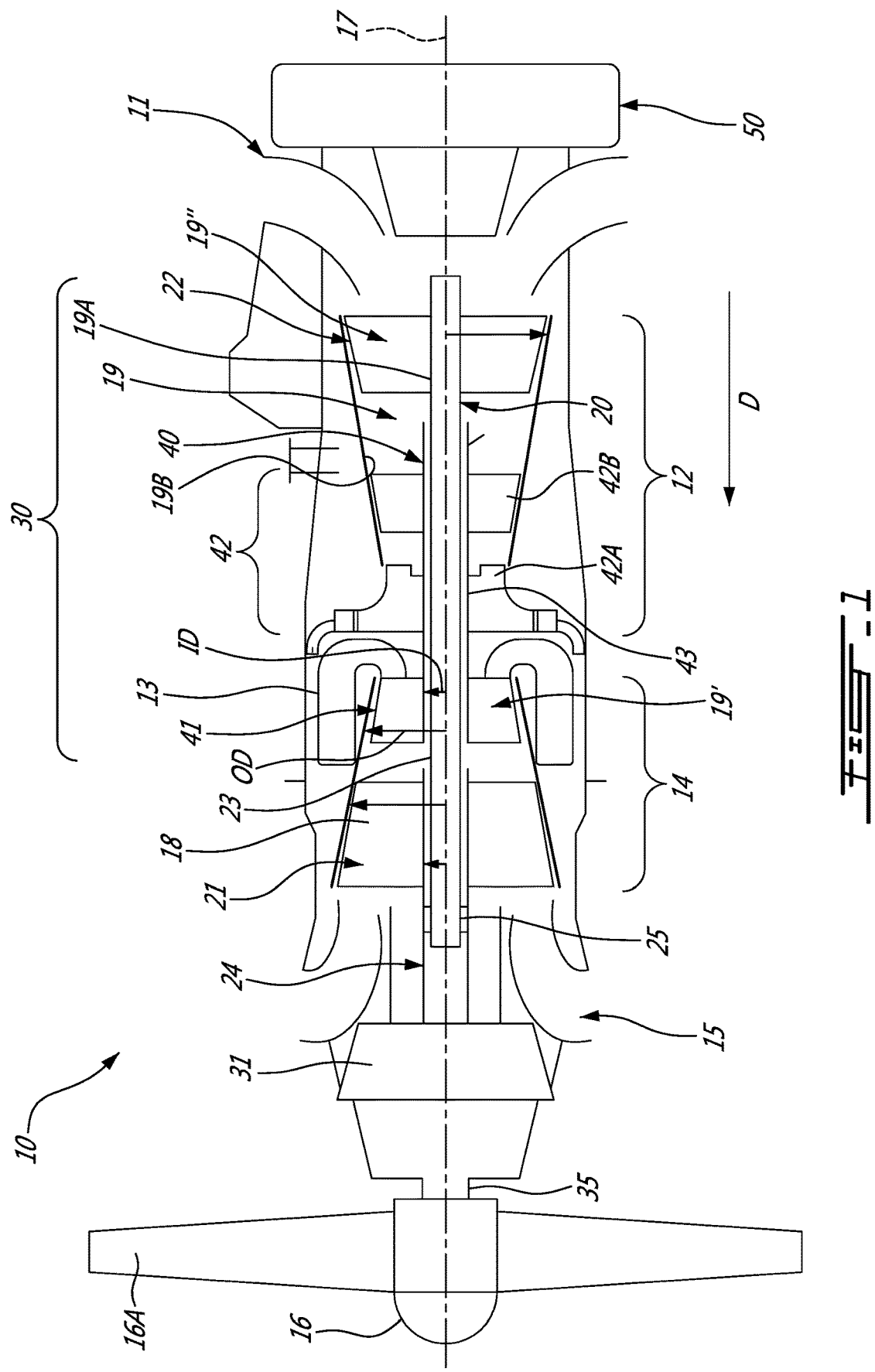
FIG. 1 is a schematic cross-sectional view of a gas turbine engine, according to an embodiment of the present disclosure.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The engine 10 includes a propeller 16 which provides thrust for flight and taxiing. The gas turbine engine 10 has a longitudinal center axis 17.

The gas turbine engine 10 (sometimes referred to herein simply as "engine 10") has a central core 18 through which gases flow and which includes some of the turbomachinery of the engine 10. The engine 10 in FIG. 1 is, in this example, a "reverse-flow" engine 10 meaning the gases flow through the core 18 from the air inlet 11 at a rear of the engine 10, to the exhaust outlet 15 at a front of the engine 10. The direction of the flow of gases through the core 18 of the engine 10 in FIG. 1 can be better appreciated by considering that the gases flow through the core 18 in the same direction D as the one along which the engine 10 travels during flight. Stated differently, gases flow through the engine 10 from a rear end thereof towards the propeller 16. The engine 10 may alternatively be a "through-flow" gas turbine engine in which gases flow through the core 18 of the engine from a front portion to a rear portion. Although a turboprop gas turbine engine is depicted and discussed, the concepts here are applicable to any suitable gas turbine engine design.

The expressions "forward" and "aft" used herein refer to the relative axial disposition of components of the engine 10 relative to their position on the aircraft, in correspondence to the "forward" and "aft" directions of the engine 10 and aircraft including the engine 10 as defined with respect to the direction of travel. In the embodiment shown, a component of the engine 10 that is "forward" of another component is arranged within the engine 10 such that it is located closer to the propeller 16, representing the foremost position of the engine 10 on a typical pull-style turboprop aircraft (i.e. not a pusher-style installation, although the present concepts are applicable thereto). Similarly, a component of the engine 10 that is "aft" of another component is arranged within the engine 10 such that it is further away from the propeller 16.

Still referring to FIG. 1, the engine 10 has multiple spools which perform compression to pressurize the air received through the air inlet 11, and which extract energy from the combustion gases before they exit the core 18 via the exhaust outlet 15.

A low pressure spool 20 has a low pressure turbine 21 which extracts energy from the combustion gases and, in this example, is drivingly engaged to a low pressure compressor 22 for pressurizing the air. The low pressure turbine 21 (sometimes referred to herein as "LP turbine 21") drives the low pressure compressor 22 (sometimes referred to herein as "LPC 22") thereby causing the LPC 22 to pressurize the air.

Both the LP turbine 21 and the LPC 22 are disposed along the center axis 17 in this example. In the depicted embodiment, both the LP turbine 21 and the LPC 22 are axial rotatable components having an axis of rotation that is coaxial with the center axis 17. They may include one or more stages of rotors and stators, depending upon the desired engine thermodynamic cycle, for example, and may be of any suitable construction, such as axial, mixed-flow or centrifugal configurations. In an embodiment, the LPC 22 is free of inlet guide vanes, while other embodiments may provide inlet guide vanes upstream of one or both compression stages (LP and/or HP). In the described embodiment, the LPC 22 has rotor blades whose pitch remains constant, though any suitable arrangement may be employed.

In the depicted embodiment of FIG. 1, the low pressure spool 20 has a power shaft 23 which mechanically couples the LP turbine 21 and the LPC 22, and extends between them. The power shaft 23 is coaxial with the center axis 17 of the engine 10. The power shaft 23 allows the LP turbine 21 to drive the LPC 22 during operation of the engine 10. The power shaft 23 is not limited to the configuration depicted in FIG. 1, and may mechanically couple the LP turbine 21 and the LPC 22 in any other suitable way provided that it transmits a rotational drive from the LP turbine 21 to the LPC 22.

Still referring to FIG. 1, the engine 10 includes an output drive shaft 24. The drive shaft 24 is distinct from the power shaft 23 and mechanically coupled thereto to be driven by the LP turbine 21. In the depicted embodiment, the drive shaft 24 and the power shaft 23 are coaxial and interconnected. FIG. 1 shows that the power and drive shafts 23,24 are interconnected with a spline 25. The spline 25, which can include ridges or teeth on the drive shaft 24 that mesh with grooves in the power shaft 23 (or vice versa), allows for the transfer of torque between the drive shaft 24 and the power shaft 23. In the depicted embodiment, the power shaft 23 lies at least partially within the drive shaft 24, such that the spline 25 transfers the rotational drive or torque generated by the LP turbine 21 from the drive shaft 24 to the power shaft 23. The spline 25 can operate so that the power shaft 23 and the drive shaft 24 rotate at the same rotational speed. Other suitable mechanical techniques may be used to interconnect the power and drive shafts 23,24. For example, the power and drive shafts 23,24 can be interconnected by curvic coupling, pins, and interference fits. Other suitable configurations of the drive shaft 24 and the power shaft 23 may be used. For example, the drive shaft 24 and the power shaft 23 can be a single shaft driven by the LP turbine 21. The drive shaft 24 therefore transfers the rotational output of the LP turbine 21 to drive another component. The details of the shaft couplings may include any suitable coupling.

A rotatable load, which in the embodiment shown is the propeller 16, is mountable to the engine 10, and when mounted, is drivingly engaged to the LP turbine 21. In such a configuration, during operation of the engine 10, the LP turbine 21 drives the rotatable load such that a rotational drive produced by the LP turbine 21 is transferred to the rotatable load. Depending on the type of gas turbine engine, the rotatable load will be any suitable propulsor or other load component(s).

In the embodiment shown, a reduction gearbox 31 (sometimes referred to herein simply as "RGB 31") is mechanically coupled to a front end of the drive shaft 24, which extends between the RGB 31 and the LP turbine 21. The RGB 31 processes and outputs the rotational drive transferred thereto from the LP turbine 21 via the drive shaft 24 through gear reduction techniques. The RGB 31 allows for the propeller 16 to be driven at its optimal rotational speed, different from the rotational speed of the LP turbine 21.

The propeller 16 is mechanically coupled to the output of the RGB 31 via a propeller shaft 35. The propeller shaft 35 allows the rotational drive outputted by the RGB 31 during operation of the engine 10 to be transferred to the propeller 16 to provide propulsion during flight. In an alternate embodiment where the engine 10 is a turboshaft engine 10, the rotational load is typically the helicopter main rotor(s) and tail rotor(s), and in the case of a turbofan (closed or open rotor), the fan(s) is the rotatable load.

Still referring to FIG. 1, the engine 10 includes a high pressure spool 40 disposed along the center axis 17 that includes a high pressure turbine 41 drivingly engaged to a high pressure compressor 42 by a high pressure shaft 43. The high pressure spool 40 is configured for rotation independently of the power shaft 23. Similarly to the LP turbine 21 and the LPC 22, the high pressure turbine 41 (sometimes referred to herein as "HP turbine 41") and the high pressure compressor 42 (sometimes referred to herein as "HPC 42") include one or more stages of rotors and stators, of any suitable configuration and number depending upon the desired engine thermodynamic cycle, performance, etc. In the depicted embodiment, the HPC 42 includes an axial compressor 42B followed by an centrifugal compressor 42A, both of which are driven by the HP turbine 41. During operation of the engine 10, the HP turbine 41 drives the HPC 42. A HP core 18 of the engine 10 may be viewed as the high pressure spool 40 (e.g. the HPC 42 and the HP turbine 41) including the combustor 13.

The above-described engine 10 has a "split compressor" arrangement, in the sense that a first stage of compression is driven by one spool and a second stage of compression is driven by the other spool. More particularly, some of the work required to compress the incoming air is split between the HPC 42 and the LPC 22. The output propulsive power ultimately is provided by the LP turbine 21, and so this turbine is sometimes referred to in the art as a "power turbine". The engine 10 shown in FIG. 1 is thus a "two-spool" engine 10.

The engine 10 may have any suitable mechanical arrangement to achieve the above-described functionality. In one example shown in FIG. 1, the high pressure spool 40 includes a high pressure shaft 43 extending between the HPC 42 and the HP turbine 41. The high pressure shaft 43 is coaxial with the power shaft 23 and rotatable relative thereto. The relative rotation between the high pressure shaft 43 and the power shaft 23 allow the shafts 23,43 to rotate at different rotational speeds, hence HPC 42 and LPC 22 rotate at different rotational speeds. The high pressure shaft 43 can be mechanically supported in any suitable fashion. In the depicted embodiment, the power shaft 23 is at least partially disposed within the high pressure shaft 43, although any suitable shaft arrangement may be used Still referring to FIG. 1, the engine 10 includes an annular gas path 19 that extends axially through the engine 10, specifically in serial flow communication from inlet 11, through the LPC 22, the HPC 42, the combustor 13, the HP turbine 41, and the LP turbine 21 to the outlet 15. The gas path 19 is aerodynamically defined between a radially-inner flow boundary surface 19A and a radially-outer flow boundary surface 19B. The flow boundary surfaces 19A,19B are walls or surfaces which delimit the radial extent of the gas path 19, and confine the flow of gases therebetween as they travel axially through the engine 10. The flow boundary surfaces 19A,19B may be defined by any suitable surface of the engine 10 which achieves this functionality. For example, the radially-outer flow boundary surface 19B may be defined by an outer shroud (which may be a series of components cooperating to provide said shroud) encasing the rotating and static components of the turbomachinery. Meanwhile, the radially-inner flow boundary surface 19A may be defined by an inner shroud (e.g., a series of components cooperating to provide said inner shroud, such as the inner hubs of rotors and inner platforms of stators or disk of the rotating components of the turbomachinery). Any suitable features and surfaces of the turbomachinery may define the flow boundary surfaces 19A,19B, depending on the engine 10 designed. The gas path 19 will be described in more detail below.

Still referring to FIG. 1, the mechanical connection between the LPC 22 and the LP turbine 21 is via the spline 25, such that the LPC 22 rotates at the same speed as the LP turbine 21. In use, the rotational speed of the LP turbine 21 is varied throughout the flight cycle using a suitable technique, such as by controlling fuel flow provided to the combustor 13 to thereby cause the LP turbine 21 (and thus the LPC 22) to rotate faster, according to the pilot or engine controller inputs. In a turboprop example of FIG. 1, rotational speed of the LPC 22 can be controlled via modifying a pitch of the propeller blades 16A. In another embodiment, the rotational speed of the LPC 22 may be controlled by varying a pitch of the rotor blades of the LPC 22 itself.

As mentioned, in the embodiment of FIG. 1, the LPC 22 is driven by the LP turbine 21 via a splined connection at a 1:1 speed ratio. However, in the embodiment partially and schematically represented in FIG. 2, the LPC 22 is driven by the LP turbine 21 via a transmission or gearing 29 (all other aspects of the engine 10 of the embodiment of FIG. 2 may be assumed to be as described with regard to FIG. 1, except as may be desired or required to be modified according to the description, as will be appreciated by those skilled in the relevant art). The gearing 29 is engaged with the power shaft 23 (or in any other suitable fashion), and allows for a rotational speed ratio between the LPC 22 and the LP turbine 21 to be more than or less than 1:1. Thus, in the FIG. 2 embodiment, the LPC 22 is driven at a different rotational speed than the LP turbine 21. The gear ratio of the gearing 29 may be fixed, in which case the speed of the LPC 22 will vary in proportion to the LP turbine 21, or may be a variable transmission which allows the speed of the LPC 22 to vary relative to the speed of the LP turbine 21. In an embodiment, the speed of the LP turbine 21 may be maintained at a constant value during operation of the engine 10 during aircraft cruise, while the speed of the LPC 22 would be greater or less than the LP turbine speed according to the gear ratio of the gearing 29. The configuration and arrangement of the gearing 29 may be any suitable. In FIG. 2, the gearing 29 is positioned centrally between the HPC 42 and the LPC 22. In another embodiment, the gearing 29 may be provided within an accessory gearbox of the engine. Other options for gearing arrangements are possible.

An electronic engine controller of the engine 10 is configured to command that the speed of the LPC 22 be varied using any one or more of the techniques described above, or other suitable techniques.

The "split compressor" architecture of the engine 10 allows a designer of engines to vary the speed of the LPC 22 as desired, from one engine variant design to the next, to modify the power output of the engine 10 variant design. This may be achieved by varying the transmission ratio between LP turbine and LP compressor, for example, without having to reconfigure or significantly modify other components of the engine 10. This ability may provide significant savings in the costs to develop new engine variants over a selected power range, and in some instances may avoid the need to recertify significant portions of a variant design of the engine 10. The disclosed architecture may allow, for example, for the re-use of a baseline LP and HP compressor design, which is configured to provide two or more engine variant designs which have different power levels.

There is therefore disclosed herein a method of creating classes, or variants, of gas turbine engines, such as turboshaft, turboprop or other engines 10, from a common engine platform 30 design. The classes of the engine 10 may be defined by their power rating or power output, with different classes of the variants of engine 10 having correspondingly different power outputs. The common engine platform 30 comprises a modular approach to configuring components that have common properties over the class of the engine variant family.

The method of creating classes of engines from the common engine platform 30 includes a step of providing a first class of the engine 10 by using the LPC 22 in a first engine variant to run at a first speed to produce a first power output. The first power output defines or categorizes a first class of the engine 10. The method also includes a step of providing a second class of the engine 10 by using the LPC 22 in a second engine variant to run at a second (different) speed to permit the second variant of engine 10 to produce a second (different) power output. The second power output defines or characterizes a second class of the engine 10. The second speed is different from the first speed, and the second power output is different than the first power output. The first and second speeds and the first and second power outputs are selected for first and second engine design points, respectively. The engine design points may be specific flight modes, for example cruise, take-off, descent, etc., at which the engine 10 may be designed to produce a specific power output. Other classes of engines may further be defined in this manner. The method therefore allows for creating engines 10 with different power outputs using a common platform/family/module of components. Further details of the approach will now be described.

Figure 1B:
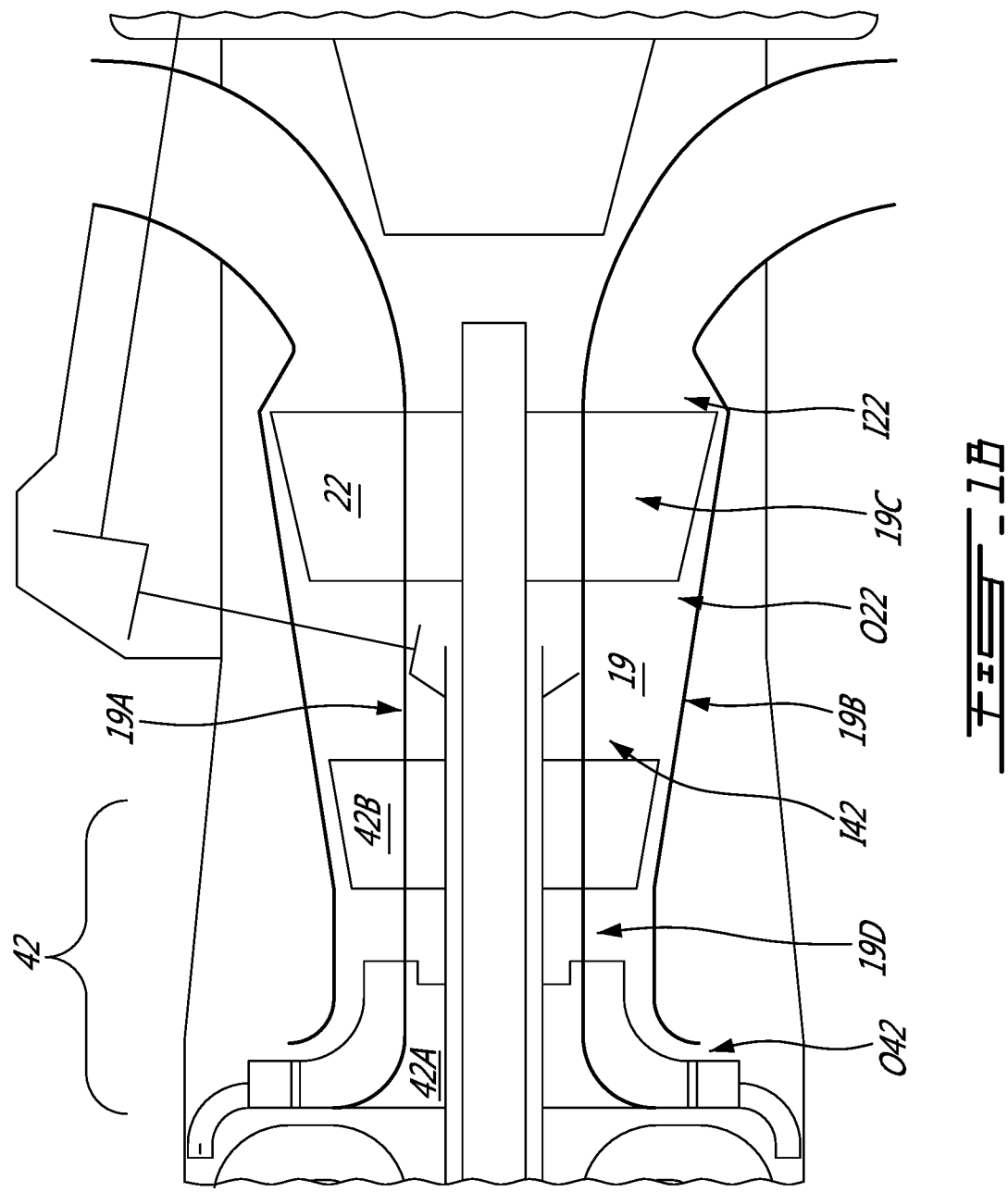
FIG. 1B is an enlarged view of the compressor of FIG. 1.

Referring again to FIG. 1 and also to FIG. 1B, it has been described that the LPC 22 and the HPC 42 are situated in a gas path 19 defined by inner and outer gas path boundaries 19A, 19B. In particular, the LPC 22 defines a portion 19C of the gas path 19, from an LP compressor inlet I22 to an LP compressor outlet O22, and the HPC 42 defines a portion 19D of the gas path 19, from an HPC inlet I42 to an HPC outlet O42. Depending on the configuration of the compressors and engines, the inlets I22,I42 will be defined by the leading edges of the blades of the respective compressor, and the outlets O22, O42 will be defined by the trailing edges of the blades of the respective compressors. In some configurations, the inlets and/or outlets may be defined by stator vanes upstream or downstream of the respective compressor (relative to the direction of airflow through the compressor). For simplicity of depiction, the images represent their respective compressor designs schematically and generically, and are not intended to depict all applicable components (for example, stator vanes are typically are present).

In context of the present description and the appended claims, an LPC 22 is said to be "the same" between two or more classes of engine variants when the gas path profile defined between the flow boundary surfaces 19A, 19B of the portion of the gas path 19C (i.e. extending between inlet I22 to outlet O22) is dimensionally the same (i.e. within manufacturing tolerances typical within the art). Likewise, in context of the present description and the appended claims, an HPC 42 is said to be "the same" between two or more classes of engine variants when the gas path profile defined between the flow boundary surfaces 19A, 19B of the portion of the gas path 19D (i.e. extending between inlet I42 to outlet O42) is dimensionally the same (i.e. within manufacturing tolerances typical within the art). There may be other differences between the respective LPCs 22 and/or HPCs 42, such as stagger angles of stator vanes (if any) to name just one example, however in the context herein "sameness" refers only to the gas path profile of the compressor between its inlet and outlet. In practice, it may be desirable to have a higher degree of similarity between the corresponding compressors of the classes of engine variants, for example to provide manufacturing synergies, lower overall part counts by using common part numbers, etc., however this is not required.

In one embodiment, the said first and second classes of the engine 10 have common, identical components. In one example, the first and second classes of the engine 10 have the following components in common: the HP turbine 41, the HPC 42, and the LPC 22. In another example, the first and second classes of the engine 10 have portions of the annular gas path 19 common, as described in greater detail below. In another example, the first and second classes of the engine 10 have the same LPC and HPC 22,42, and also LP turbine 21. A variety of other combinations are available, as the skilled reader will appreciate in context of the present description.

Different levels of similarity between engine classes are contemplated in the present disclosure. For one example, identical compressor components are used in the different classes of the engine 10, such that the component in each of the classes of the engine 10 has the same part number, and gearing 29 (or the absence of gearing) is modified among classes to provide varying power (etc.) among the engine classes. In one such configuration, the LPC 22 has the same part number for different classes of the engine 10. In another such configuration, the HPC 42 has the same part number for different classes of the engine 10. In another such configuration, LPC 22 and the HPC 42 have the same part number in different classes of the engine 10.

However, identicality is not required, provided that the LPC 22 and the HPC 42 have the same gas path profiles, respectively, among the engines. Doing so may help to preserve aerodynamic characteristics among the compressors of the engine classes. Other features of the compressors, such as airfoil stagger or other parameters, may be varied without departing from the aerodynamic "sameness" between the compressors of the engine classes. In such cases, as above, different classes of engines are provided through modifying the relative speed/power characteristics of the engines, for example by changing speed ratios between compressors among the different classes.

The method may permit using components that are similar enough among the different classes of the engines 10 to avoid the need for, or reduce the difficulty of, recertifying the components of a subsequent engine class after airworthiness certification is obtained for the first engine. Changes among classes may include things such as different shaft arrangements, modification from a reverse-flow to through-flow engine or vice-versa, modification from turboprop to turboshaft or other type of gas turbine engine, different/re-optimized LP or HP turbine(s) and so on. The commonality among compressor and/or turbine hardware in such engine classes may be sufficient to lower the costs of designing and certifying a new engine class using the methods described herein. For example, the LP turbine 21 in the different classes of the engine 10 may have the same turbine disk, but the blades or airfoils of the LP turbine 21 may be different in the different classes of the engine 10.

Similarity among classes of engines may include similarity in the respective non-rotating components of the classes of the engine 10.

Referring again to FIG. 1B, the gas path portions or profiles 19C, 19D of the LPC 22 and HPC 42 in each of the different classes of the engine 10 remain the same, as discussed above. The first and second classes of the engine 10 will have, for example, the same inner and outer diameters ID,OD of the gas path profiles 19C, 19D among the various classes of engines 10 (i.e. within a specified manufacturing and assembly tolerances), see FIG. 1. A typical manufacturing/assembly tolerance on a compressor gas path dimensions may be, for example, approximately 0.010 in to 0.0150 (+/−0.005 in) for a low pressure compressor shroud, and about half of this for a high pressure compressor shroud. Referring still to FIG. 1B, LPC 22 gas path profile 19C has an inner and outer diameter at the inlet I22, and an inner and outer diameter at the outlet O22, which are identical (but for tolerancing) among the classes of engines. The classes of the engine 10 will also have the same annular profile for gas path profile 19D of the HPC 42, such that the inner and outer diameter at the inlet I42, and an inner and outer diameter at outlet O42, are identical (but for tolerancing) among the classes of engines. The gas path profiles 19C, 19D are therefore the same along the LPC 22 and the HPC 42 in the various classes of the engine based on engine 10.

Optionally, and referring to FIG. 1, an annular profile of the gas path 19' at the HP turbine 41 may have the same gas path profile (subject to applicable tolerancing, as discussed elsewhere herein) among the classes of the engine 10. Optionally, an annular profile 19" of the gas path at the LP turbine 21 may have the same gas path profile (subject to applicable tolerances) among the classes of the engine 10.

In an example, first and second classes of the engine 10 are provided with different power classes whilst having the same LP and HP compressors (according to the description herein) by modifying the speed at which the LPC 22 operates relative to the respective LP turbine 21 (i.e. by speeding up or slowing down the low pressure spool 20 altogether, or by changing the speed ratio of the LPC 22 relative to the driving LP turbine 21). Thus, in an embodiment, a second class of the engine 10 can be obtained from a first class by running the LPC 22 and the LP turbine 21 of the second class at a different nominal speed relative to the first, which may allow many or all the other components of engine 10 to remain the same among the two classes. Doing so may provide a way to provide different classes using a high degree of commonality between hardware. Therefore, FIG. 1 represents a range of classes of the engine 10, in which similar components which vary in the speed at which the LPC 22 is designed to run. Various architectures are available for the engine 10. See for example, US publications nos. US20180023482A1, US20180216525A1, US20180073428A1, US20180023480A1, US20180023470A1, US20180023481A1, US20180023482A1, US20180172012A1, US20180223739A1, US20180230902A1, US20180073429A1, US20180320811A1, US20180266429A1, US20190017442A1, the entire content of each of which is incorporated herein by reference.

Referring to FIG. 7, an embodiment according to US20180023480A1 is depicted. The engine 10 has, notably, an LPC 22, HPC 42 comprising rotors 42A and 42B, an HP turbine 41 and an LP turbine 21. The low pressure spool 20 has a power shaft 23 and an LP turbine 21. A high pressure spool 40 is disposed along the center axis 17 and includes a high pressure turbine 41 drivingly engaged to a high pressure compressor 42 by a high pressure shaft 43. Gearing 29 connects the power shaft 23 and/or the HP shaft 43 with a shaft driving the LPC 22. Unless otherwise indicated, like reference numerals refer to elements described hereinabove.

Figure 7B:
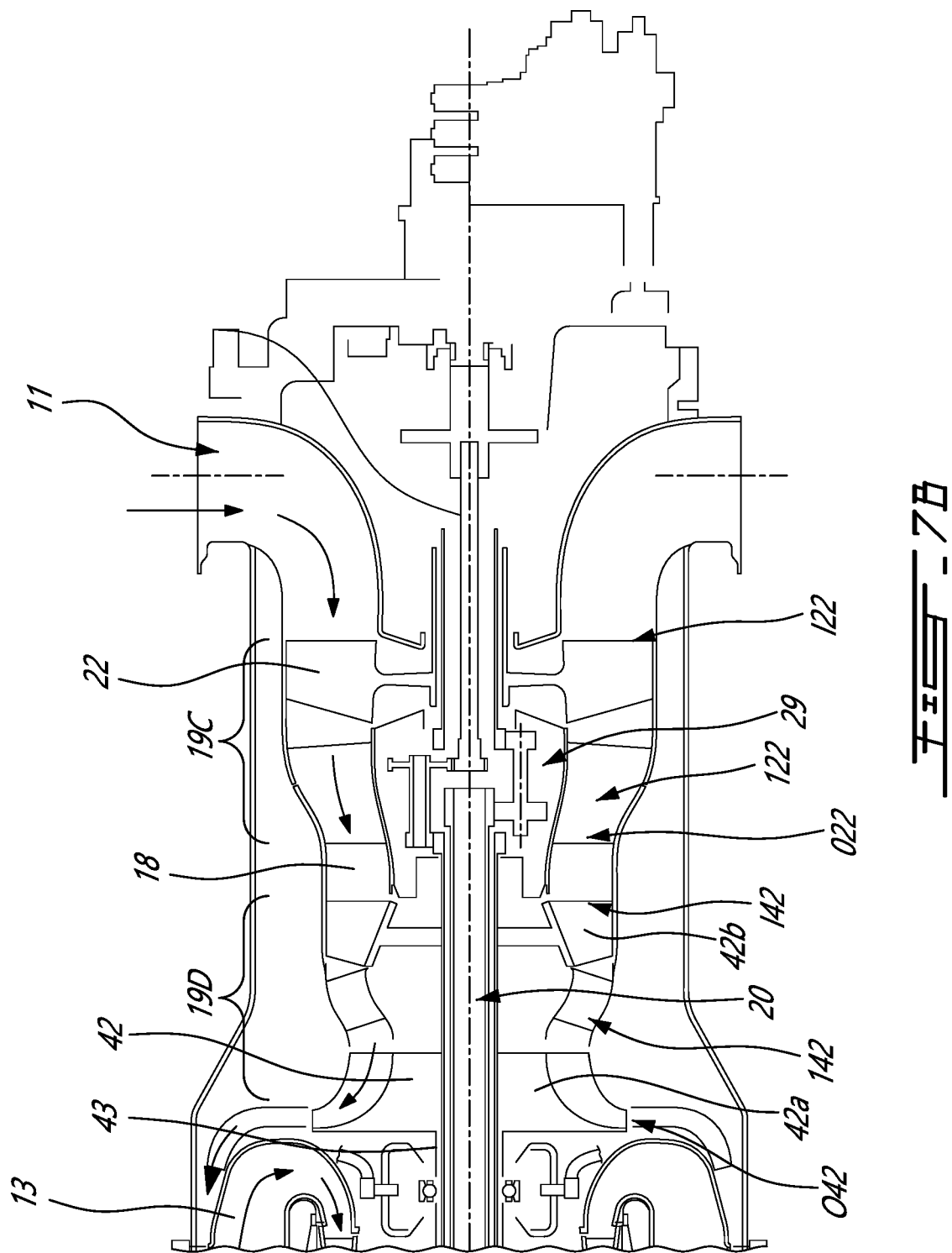

Referring to FIGS. 7 and 7B, in this embodiment the engine 10 has an LPC 22, having gas path profile 19C extending between inlet I22 and outlet O22 (see FIG. 7B). The LPC 22 in this example is an axial flow rotor with a stator array 122 downstream (relative to gas flow through the engine) of the rotor. The inlet I22 is defined relative to the leading edges of the rotor of LPC 22, while the LPC outlet O22 in this example is defined relative to the trailing edges of stator array 122.

Referring still to FIGS. 7 and 7B, the engine 10 has an HPC 42, having gas path profile 19D extending between inlet I42 and outlet O42 (see FIG. 7B). The HPC 42 in this example has a mixed flow rotor 42B followed by a centrifugal rotor 42A with a stator array 142 disposed between them. The HPC inlet I42 is defined relative to the leading edges of the rotor 42B of HPC 42, while the HPC outlet O42 in this example is defined relative to the exit of the centrifugal rotor 42A.

Gearing 29 may be modified between engine classes to modify a gear ratio thereof.

Figure 3:
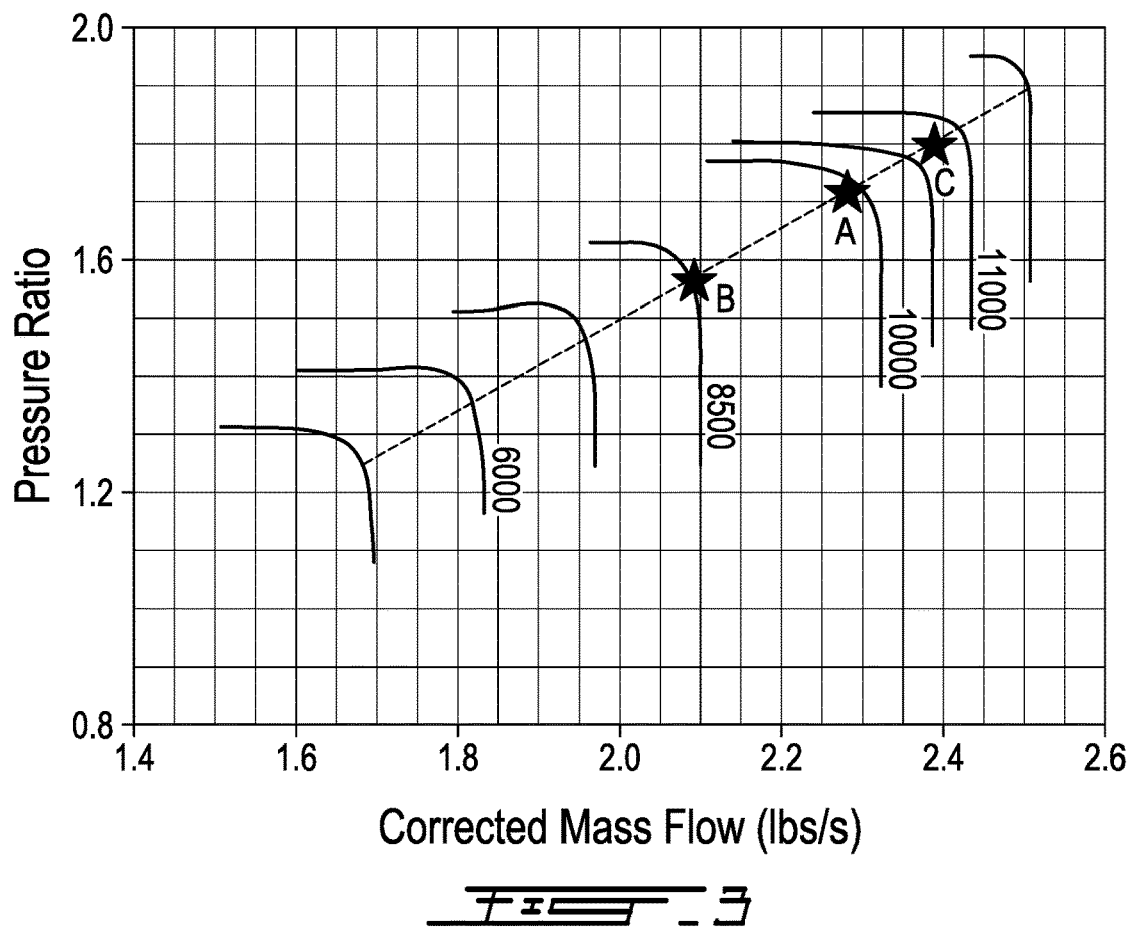
FIG. 3 is a graph plotting pressure ratio of a gas turbine engine as a function of mass flow, superimposing speed curves for a low pressure compressor (LPC) thereon.
Figure 4:
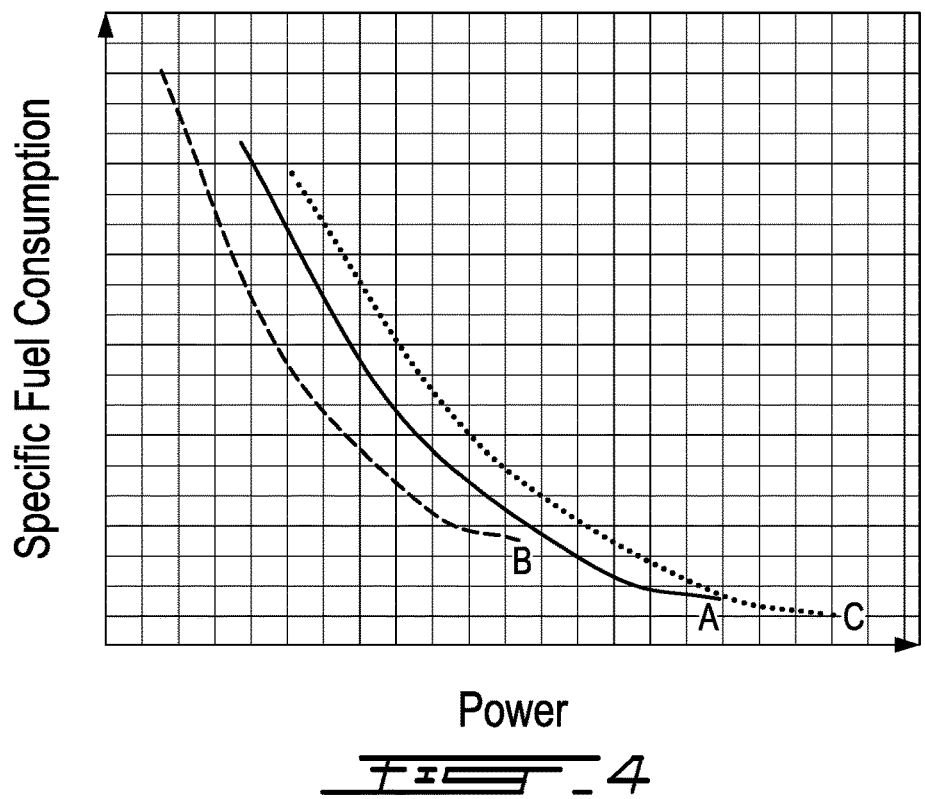
FIG. 4 is a graph plotting specific fuel consumption of a gas turbine engine as a function of power for the LPC speeds of FIG. 3.

Referring now to FIGS. 3 and 4, a relationship between the speed of the LPC 22 and the power output of the engine 10 is shown. FIG. 3 is an example of a compressor map for the LPC 22, and shows speed curves for the LPC 22 on a graph plotting pressure ratio (unitless) of the gas turbine engine 10 as a function of corrected mass flow in lb/s. The speed curve A represents the LPC 22 operating at a rotational speed of 10,000 RPM, the speed curve B represents the LPC 22 operating at a rotational speed of 8,500 RPM, and the speed curve C represents the LPC 22 operating at a rotational speed of 11,000 RPM. FIG. 4 shows specific fuel consumption (SFC) of the engine 10 as a function of power output of the engine 10 with the LPC 22 operating at the same speed curves A,B,C of FIG. 3. As can be seen, for a given value of SFC, a higher speed of the LPC 22 produces a higher power output of the engine 10. Thus it is possible to increase the power output of the engine 10 by configuring it so that the LPC 22 runs at an increased speed. The increase in power may result from the faster LPC 22 increasing the overall pressure ratio of the engine 10 and/or driving a greater mass of air into the high pressure spool 40. Similarly, configuring the engine 10 or the platform 30 so that the LPC 22 runs at a lower speed may decrease the power output of the engine 10, and also decrease the SFC of the engine 10.

The ability of the engine 10 to match the speed of the LPC 22 to that of the LP turbine 21 (also known as "speed matching"), or to simply vary the speed of the LPC 22, allows for choosing a specific operating point for the LPC 22. For the sake of example, the first class of the engine 10 is designed to have the LPC 22 operating according to the speed curve C. It is desired to make another engine 10 from the common engine platform 30, one that is designed to have the LPC 22 operating according to the speed curve A. The gearing 29 of the common engine platform 30 may thus be modified to reduce the LPC 22 to LP turbine 21 gear ratio, such that the speed of the LPC 22 is reduced to conform with the speed curve A. From this example, it can be appreciated that by making relatively minor changes to some features of the common engine platform 30, but maintaining the same LPC 22 and LP turbine 21, it may be possible to provide a new class of engine 10 based on minor modifications to an existing engine platform. Such an approach helps to offer an engine optimized for power and low fuel consumption with a lower development cost by re-using an existing design and exploiting the full capability of the LPC 22. In some conventional engines where the LPC and the low pressure turbine are decoupled, a change in low pressure turbine speed has limited impact on the position of the low pressure compressor operating point, and thus these conventional engines offer a limited possibility of power/fuel optimization for a given set of compressor and turbine components.

Another embodiment for varying the speed of the LPC 22 is now described with reference to FIG. 1. The propeller 16 has variable-pitch propeller blades 16A, meaning that the pitch of the propeller blades 16A may be varied while they rotate. The rotational speed of the propeller 16 and the propeller shaft 35 can be controlled by controlling the pitch of the propeller blades 16A. The speed of the LPC 22 may be decreased while varying a pitch of the blades 16A to decrease a speed of the propeller 16. For example, a propeller governor of the engine 10 may order a change in pitch of the propeller blades 16A to reduce the speed of the propeller 16. The reduced speed of the propeller 16 translates into a lower speed of the LP turbine 21, and thus of the LPC 22. Therefore, as the speed of the LPC 22 decreases, and thus the power output of the engine 10 decreases, the pitch angle of the propeller blades 16A may be set so that the propeller 16 spins slower, which may contribute to improved SFC of the engine 10. Reference is made to U.S. patent application Ser. No. 15/623,154 filed Jun. 14, 2017, and to US provisional patent application No. 62/413,121 filed Oct. 26, 2016, the entire contents of each of which is incorporated by reference herein. The ability to control the speed of the propeller 16 is in contrast to the function of fans in a turbofan engine. In some turbofan engines, the speed of the fan is not actively controlled, but is instead set as a result of thermodynamic effects. While the description of the propeller 16 relates to a turboprop engine 10, in the embodiment where the engine 10 is a turboshaft, the same description of controlling the speed and varying pitch applies to the main or tail rotor of a helicopter, for example.

Figure 5:
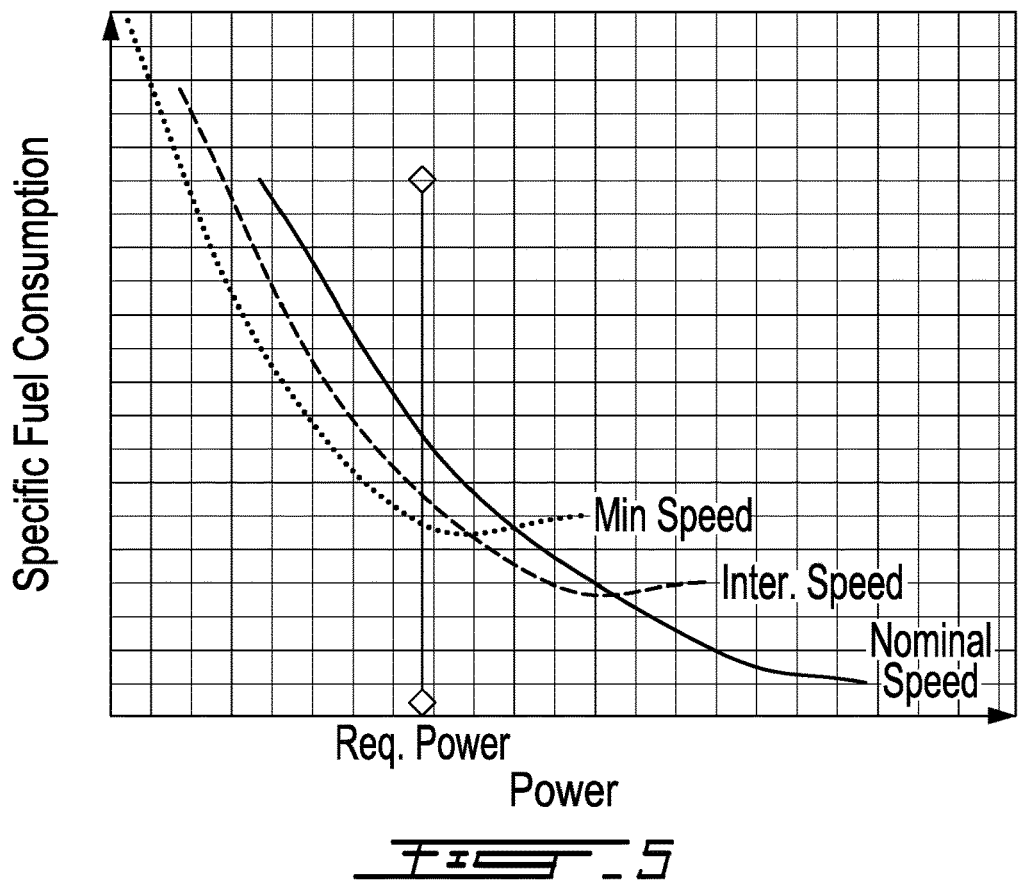
FIG. 5 is a graph plotting specific fuel consumption of a gas turbine engine as a function of power for three LPC speeds.

FIG. 5 shows how the linked LPC 22 and LP turbine 21 architecture of the engine 10 may be used to obtain optimum performance at an engine power level that is lower than the maximum power of the engine. FIG. 5 shows three speed curves of the LPC 22 on a graph plotting SFC of the engine 10 as a function of power output of the engine 10. The "Nominal Speed" speed curve is the rotational speed of the LPC 22 at which the engine 10 is designed to operate for highest power at the lowest SFC. The nominal speed is typically higher than needed for all flight segments (i.e. is "overmatched") in order to accommodate specific aircraft variations and to build in safety margins. The "Minimum Speed" curve is the minimum accepted value for the rotational speed of the LPC 22. During some flight segments, such as cruise, descent, take-off, taxiing, etc., the power requirements for the engine 10 may not require running the LPC 22 at the nominal speed. At such lower power requirement flight segments, the linked LPC 22 and LP turbine 21 architecture allows for designing the engine 10 to run the LPC 22 at a lower speed to reduce the power output of the engine 10.

Thus, when the required power output of the engine 10 for a given flight segments is determined, the LPC 22 may be designed so that its speed can be decreased below that of the nominal speed, as shown in FIG. 5 with the "Intermediate Speed" curve and the Required Power line. As shown in FIG. 5, this may help to reduce the SFC of the engine 10 at the Required Power, thereby helping to optimize the performance of the engine 10 at the Required Power output. If the speed of the LPC 22 is decreased, it may be necessary to increase the speed of the HPC 42 to maintain the required power output of the engine and/or to maintain the overall pressure ratio of the compressor section 12. In most instances, the speed of the LPC 22 will be maintained above the minimum speed.

Assuming a given existing full engine hardware, it is possible to make relatively small changes to the gear train between the LPC 22 and the LP turbine 21, or to re-blade the LP turbine 21 stage to get an optimum solution to meet customer expectation. An optimum solution of gear ratio and LP speed can be selected to satisfy customer expectation. The output power is proportional to both LP turbine 21 (and coupled LPC 22) speed, and LPC 22/LP turbine 21 speed ratio. Both parameters can be adjusted to obtain the desired power while minimizing SFC.

Figure 6:
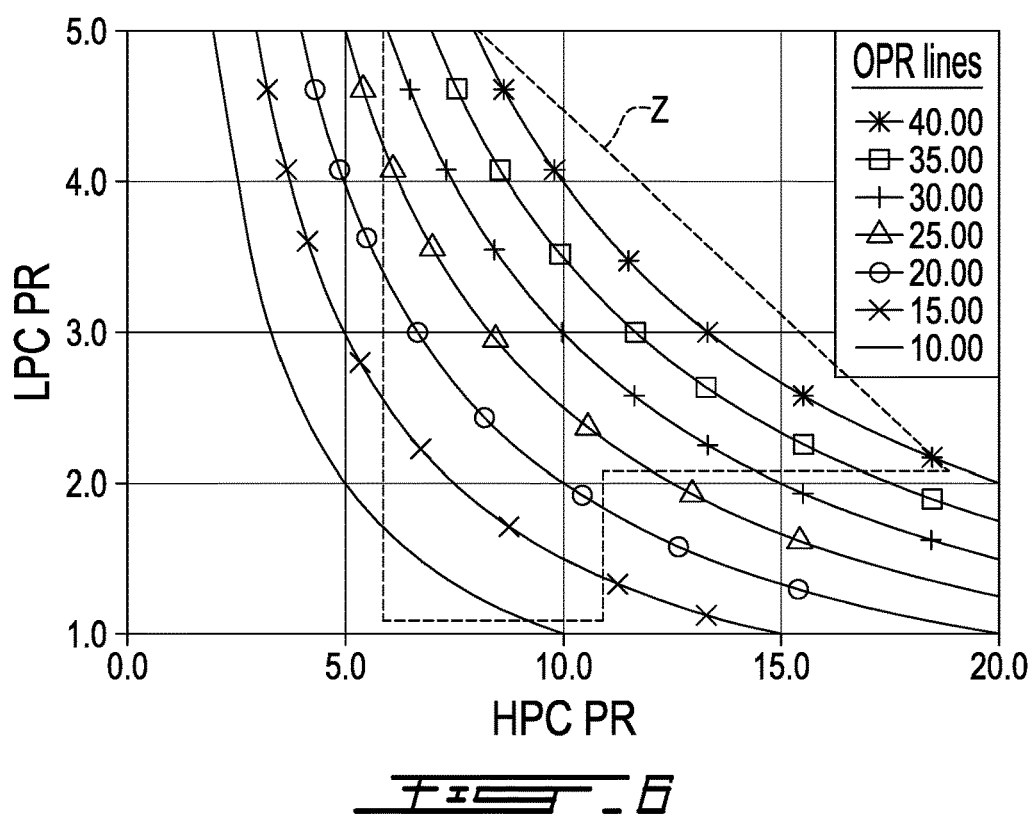
FIG. 6 is a graph plotting low pressure compressor pressure ratio and high pressure compressor pressure ratio, for different overall pressure ratios.

FIG. 6 shows how the common engine platform 30 may be configured so that compression is split between the LPC 22 and the HPC 42. FIG. 6 shows the pressure ratio (PR) of the LPC 22 as a function of the pressure ratio of the HPC 42. FIG. 6 also shows lines of overall pressure ratio (OPR) for the compressor section 12. The OPR is determined by multiplying the PR value for the LPC 22 with the PR value for the HPC 42. The PR of the LPC 22, the PR of the HPC 42, and/or the OPR of the compressor section 12 are parameters or characteristics of the LPC 22, the HPC 42, and/or the compressor section 12 that may be set or established when designing the engine 10 from the common engine platform 30. For example, if the engine 10 is designed to have a compressor section 12 with an OPR of 30, it can be determined that lowering the speed of the LPC 22 and consequently lowering its PR from 4 to 3 will require that the PR of the HPC 42 increase from 7.5 to 10. A range of values for the PR of the LPC 22 is between and includes 1.1 to 5.0, plus or minus acceptable deviations. A range of values for the PR of the HPC 42 is between and includes 6.0 and 18.0, plus or minus acceptable deviations. These values for the PRs of the LPC 22 and the HPC 42 define a zone Z. Within the zone Z, a range of values for the OPR of the compressor section 12 is between 10 and 40, plus or minus acceptable deviations. Operating the compressor section 12 in the zone Z is believed to allow for adequate work balance between the LPC 22 and the HPC 42. Having too low a work share on the LPC 22 may reduce the potential for the benefits in power and SFC described herein. Having too high a work share on the LPC 22 may drive HPC 42 further from its optimal operating point when the LPC 22 speed is modulated, which may reduce potential for the benefits in power and SFC. Furthermore, a highly loaded compressor section 12 may have an impact on the operability (acceleration and deceleration rate) of the engine 10.

Referring to FIG. 1, there is disclosed a method of assembling a gas turbine engine, such as a turboprop, turboshaft or other gas turbine aircraft engine 10. The method includes drivingly connecting the HP turbine 41 to the HPC 42 to form the HP core of the engine 10. The method includes drivingly connecting the LP turbine 21 to the load, and drivingly connecting the LPC 22 to the LP turbine 21 to drive the LPC 22 at a speed equal to, or different from, a speed of the LP turbine 21.

The engine 10 disclosed herein may form a modular engine platform design that may provide a wide power range coverage. With this design philosophy, several component modules may be designed in conformance with specific key interfaces and dimensional constraints. Different engines may evolve around a specific HP core design on which small adjustments could be incorporated. The low-spool components surrounding the HP core may be interchanged/tailored to meet specific power demand of the engine 10. The specific characteristics of this architecture may allow for an optimum performance over a large power range with a common LPC 22.

Disclosed herein is a method of creating classes of a turboshaft or turboprop engine from a common engine platform, the common engine platform having a longitudinal center axis, a core having a high pressure turbine drivingly connected to a high pressure compressor, a low pressure turbine drivingly connected to a low pressure compressor and to a rotatable load, and an annular gas path extending radially between a radially-inner flow boundary surface and a radially-outer flow boundary surface and extending axially through the low pressure compressor, the high pressure compressor, the high pressure turbine, and the low pressure turbine, the method comprising: creating a first class of the turboshaft or turboprop engine by configuring the low pressure compressor to run at a first speed to produce a first power output; and creating a second class of the turboshaft or turboprop engine by using the low pressure compressor to run at a second speed to produce a second power output, the second speed being different from the first speed and the second power output being different than the first power output, the annular gas path of the first and second classes of the turboshaft or turboprop engine having a same gas path profile around the core.

Disclosed herein is a turboprop or turboshaft aircraft engine, comprising: a high pressure spool including a high pressure turbine drivingly connected to a high pressure compressor; a low pressure spool including a low pressure compressor fluidly connected to the high pressure compressor to supply compressed air thereto, a low pressure turbine drivingly connected to the low pressure compressor to drive the low pressure compressor; and a load drivingly connected to the low pressure turbine, the load consisting of one of a propeller and a helicopter rotor.

Disclosed herein is a method of forming a gas turbine engine having a high pressure turbine drivingly connected to a high pressure compressor, a low pressure turbine drivingly connected to a low pressure compressor, and a propeller or rotor load drivingly connected to the low pressure turbine.

Disclosed herein is a gas turbine engine platform, comprising: a first engine having a high pressure turbine drivingly connected to a high pressure compressor, and a low pressure turbine drivingly connected to a low pressure compressor, the low pressure compressor configured to run at a first speed to produce a first power output of the first engine; and a second engine having the low pressure compressor to run at a second speed to produce a second power output, the second speed different from the first speed and the second power output different than the first power output, the second engine having the same high pressure turbine, high pressure compressor, and low pressure turbine.

Disclosed herein is are classes of a gas turbine engine, comprising: a first class of the gas turbine engine having a longitudinal center axis, a core having a high pressure turbine drivingly connected to a high pressure compressor, a low pressure turbine drivingly connected to a low pressure compressor and to a rotatable load, and an annular gas path extending radially between a radially-inner flow boundary surface and a radially-outer flow boundary surface and extending axially through the low pressure compressor, the high pressure compressor, the high pressure turbine, and the low pressure turbine, a gas path profile of the annular gas path defined around the core, the low pressure compressor configured to run at a first speed to produce a first power output; and a second class of the gas turbine engine comprising the same gas path profile around the core as the first class of the gas turbine engine, and the low pressure compressor of the first class of the gas turbine engine, the low pressure compressor in the second class of the gas turbine engine configured to run at a second speed to produce a second power output, the second speed being different from the first speed and the second power output being different than the first power output.

Disclosed herein is a method of providing at least two classes of an aircraft gas turbine engine, the method comprising: providing a first class of the engine having a first high pressure turbine driving a first high pressure compressor, and a first low pressure turbine driving a first low pressure compressor and an output configured to drive a rotating aircraft propulsion load, the first low pressure compressor and the first high pressure compressor having respective first gas path profiles extending from respective inlets to respective outlets of the first high and low pressure compressors, said first gas path profiles respectively defined between a radially-inner flow boundary surface and a radially-outer flow boundary surface of the respective compressor; configuring the first class of the engine so that the first low pressure compressor in use runs at a first speed to produce a first power output at a first engine selected design point; providing a second class of the engine having a second high pressure turbine driving a second high pressure compressor, a second low pressure turbine driving a second low pressure compressor and an output configured to drive a rotating aircraft propulsion load, the second low pressure compressor and the second high pressure compressor having respective second gas path profiles extending from respective inlets to respective outlets of the second high and low pressure compressors, said second gas path profiles respectively defined between a radially-inner flow boundary surface and a radially-outer flow boundary surface of the respective compressor, the second gas path profile of the second low pressure compressor is the same as the first gas path profile of the first low pressure compressor, and the second gas path profile of the second high pressure compressor is the same as the first gas path profile of the first high pressure compressor; and configuring the second class of the engine so that the second low pressure compressor in use runs at a second speed to produce a second power output at a second engine selected design point, the second speed different from the first speed and the second power output different from the first power output.

The above description is meant to be exemplary only, and one skilled in the art will recognize that changes may be made to the embodiments described without departing from the scope of the invention disclosed. For example, any suitable layout may be used of the engine 10, and may suitably vary among classes of engines within the platform. The present disclosure is applicable to turboprop and turboshaft applications, where such engine types are challenged or constrained in that the low spool is not self-free-floating but "governed" externally by the aircraft load (i.e. propeller or rotor), however it may nevertheless be applied to any suitable engine type. Individual engine classes within a platform need not be selected from the same engine type; in other words a first class of engine may be a turboprop, a second class may be a turboshaft, and so on. Still other modifications which fall within the scope of the present invention will be apparent to those skilled in the art, in light of a review of this disclosure, and such modifications are intended to fall within the appended claims.

The invention claimed is:

1. A method of providing at least two classes of an aircraft gas turbine engine, the method comprising:
   providing a first class of the engine having a first high pressure turbine driving a first high pressure compressor, and a first low pressure turbine driving a first low pressure compressor and driving an output configured to drive a rotating aircraft propulsion load, the first low pressure compressor and the first high pressure compressor having respective first gas path profiles extending from respective inlets to respective outlets of the first high and low pressure compressors, said first gas path profiles respectively defined between a radially-inner flow boundary surface and a radially-outer flow boundary surface of the respective compressor;
   configuring the first class of the engine so that the first low pressure compressor in use runs at a first speed to produce a first power output, including configuring the first class of the engine to have a first speed ratio of a rotational speed of the first low pressure compressor to a rotational speed of the first low pressure turbine;
   providing a second class of the engine having a second high pressure turbine driving a second high pressure compressor, a second low pressure turbine driving a second low pressure compressor and driving an output configured to drive a rotating aircraft propulsion load, the second low pressure compressor and the second high pressure compressor having respective second gas path profiles extending from respective inlets to respective outlets of the second high and low pressure compressors, said second gas path profiles respectively defined between a radially-inner flow boundary surface and a radially-outer flow boundary surface of the respective compressor, the second gas path profile of the second low pressure compressor is the same as the first gas path profile of the first low pressure compressor, and the second gas path profile of the second high pressure compressor is the same as the first gas path profile of the first high pressure compressor; and
   configuring the second class of the engine so that the second low pressure compressor in use runs at a second speed to produce a second power output, the second speed different from the first speed and the second power output different from the first power output, including configuring the second class of the engine to have a second speed ratio of a rotational speed of the second low pressure compressor to a rotational speed of the second low pressure turbine, the second speed ratio different than the first speed ratio.

2. The method of claim 1, wherein the first and second classes of the engine are selected from the group consisting of a turboprop style gas turbine engine and a turboshaft style gas turbine engine.

3. The method of claim 1, wherein the first and second classes of the engine are turboprop style gas turbine engines.

4. The method of claim 1, wherein the first and second classes of the engine are turboshaft style gas turbine engines.

5. The method of claim 1, wherein one of the first and second classes of the engine is a turboprop style gas turbine engine and another of the first and second classes of the engine is a turboshaft style gas turbine engine.

6. The method of claim 1, wherein the first and second gas path profiles of the respective low pressure compressors extend from the inlet of the respective compressor defined by leading edges of rotor blades of the respective compressor to the outlet of the respective compressor defined by trailing edges of stator vanes of the respective compressor.

7. The method of claim 2, wherein the first and second gas path profiles of the respective low pressure compressors extend from the inlet of the respective compressor defined by leading edges of rotor blades of the respective compressor to the outlet of the respective compressor defined by trailing edges of stator vanes of the respective compressor.

8. The method of claim 3, wherein the first and second gas path profiles of the respective low pressure compressors extend from the inlet of the respective compressor defined by leading edges of rotor blades of the respective compressor to the outlet of the respective compressor defined by trailing edges of stator vanes of the respective compressor.

9. The method of claim 4, wherein the first and second gas path profiles of the respective low pressure compressors extend from the inlet of the respective compressor defined by leading edges of rotor blades of the respective compressor to the outlet of the respective compressor defined by trailing edges of stator vanes of the respective compressor.

10. The method of claim 5, wherein the first and second gas path profiles of the respective low pressure compressors extend from the inlet of the respective compressor defined by leading edges of rotor blades of the respective compressor to the outlet of the respective compressor defined by trailing edges of stator vanes of the respective compressor.

11. The method of claim 6, wherein the first and second gas path profiles of the respective high pressure compressors extend from the inlet of the respective compressor defined by leading edges of rotor blades of the respective compressor to the outlet of the respective compressor defined by trailing edges of rotor blades of the respective compressor.

12. The method of claim 7, wherein the first and second gas path profiles of the respective high pressure compressors extend from the inlet of the respective compressor defined by leading edges of rotor blades of the respective compressor to the outlet of the respective compressor defined by trailing edges of rotor blades of the respective compressor.

13. The method of claim 8, wherein the first and second gas path profiles of the respective high pressure compressors extend from the inlet of the respective compressor defined by leading edges of rotor blades of the respective compressor to the outlet of the respective compressor defined by trailing edges of rotor blades of the respective compressor.

14. The method of claim 9, wherein the first and second gas path profiles of the respective high pressure compressors extend from the inlet of the respective compressor defined by leading edges of rotor blades of the respective compressor to the outlet of the respective compressor defined by trailing edges of rotor blades of the respective compressor.

15. The method of claim 10, wherein the first and second gas path profiles of the respective high pressure compressors extend from the inlet of the respective compressor defined by leading edges of rotor blades of the respective compressor to the outlet of the respective compressor defined by trailing edges of rotor blades of the respective compressor.

16. The method of claim 2, wherein both the first and second class of the engine are the same style of engine.

17. The method of claim 1, wherein the second class of the engine has a second LPT gas path profile of the second low pressure turbine that is the same as a first LPT gas path profile of the first low pressure turbine of the first class of the engine.

18. The method of claim 2, wherein the second class of the engine has a second LPT gas path profile of the second low pressure turbine that is the same as a first LPT gas path profile of the first low pressure turbine of the first class of the engine.

19. The method of claim 3, wherein the second class of the engine has a second LPT gas path profile of the second low pressure turbine that is the same as a first LPT gas path profile of the first low pressure turbine of the first class of the engine.

20. The method of claim 4, wherein the second class of the engine has a second LPT gas path profile of the second low pressure turbine that is the same as a first LPT gas path profile of the first low pressure turbine of the first class of the engine.

21. The method of claim 5, wherein the second class of the engine has a second LPT gas path profile of the second low pressure turbine that is the same as a first LPT gas path profile of the first low pressure turbine of the first class of the engine.

22. The method of claim 1, wherein providing the second class of the engine includes providing the second high pressure turbine to be the same as the first high pressure turbine of the first class of the engine.

23. The method of claim 2, wherein providing the second class of the engine includes providing the second high pressure turbine to be the same as the first high pressure turbine of the first class of the engine.

24. The method of claim 3, wherein providing the second class of the engine includes providing the second high pressure turbine to be the same as the first high pressure turbine of the first class of the engine.

25. The method of claim 4, wherein providing the second class of the engine includes providing the second high pressure turbine to be the same as the first high pressure turbine of the first class of the engine.

26. The method of claim 5, wherein providing the second class of the engine includes providing the second high pressure turbine to be the same as the first high pressure turbine of the first class of the engine.

27. The method of claim 1, wherein providing the second class of the engine includes providing the second low pressure turbine to be the same as the first low pressure turbine of the first class of the engine.

28. The method of claim 2, wherein providing the second class of the engine includes providing the second low pressure turbine to be the same as the first low pressure turbine of the first class of the engine.

29. The method of claim 3, wherein providing the second class of the engine includes providing the second low pressure turbine to be the same as the first low pressure turbine of the first class of the engine.

30. The method of claim 4, wherein providing the second class of the engine includes providing the second low pressure turbine to be the same as the first low pressure turbine of the first class of the engine.

31. The method of claim 5, wherein providing the second class of the engine includes providing the second low pressure turbine to be the same as the first low pressure turbine of the first class of the engine.

32. A gas turbine engine platform, comprising:
a first engine having a first high pressure turbine driving a first high pressure compressor, and a first low pressure turbine driving a first low pressure compressor and an output configured to drive a rotating aircraft propulsion load, the first low pressure compressor and the first high pressure compressor having respective first gas path profiles extending from respective inlets to respective outlets of the first high and low pressure compressors, the first gas path profiles respectively defined between a radially-inner flow boundary surface and a radially-outer flow boundary surface of the respective compressor, the first low pressure compressor configured to run at a first speed to produce a first power output at a first engine selected design point, a first speed ratio of a rotational speed of the first low pressure compressor to a rotational speed of the first low pressure turbine; and
a second engine having a second high pressure turbine driving a second high pressure compressor, a second low pressure turbine driving a second low pressure compressor and an output configured to drive a rotating aircraft propulsion load, the second low pressure compressor and the second high pressure compressor having respective second gas path profiles extending from respective inlets to respective outlets of the second high and low pressure compressors, the second gas path profiles respectively defined between a radially-inner flow boundary surface and a radially-outer flow boundary surface of the respective compressor, the second gas path profile of the second low pressure compressor is the same as the first gas path profile of the first low pressure compressor, and the second gas path profile of the second high pressure compressor is the same as the first gas path profile of the first high pressure compressor, the second low pressure compressor configured to run at a second speed to produce a second power output at a second engine selected design point, the second speed different from the first speed and the second power output different from the first power output, a second speed ratio of a rotational speed of the second low pressure compressor to a rotational speed of the second low pressure turbine, the second speed ratio different than the first speed ratio.

* * * * *